US008457121B1

(12) United States Patent
Sharma et al.

(10) Patent No.: US 8,457,121 B1
(45) Date of Patent: Jun. 4, 2013

(54) HETEROGENEOUS NETWORK SWITCH SYSTEM

(75) Inventors: Puneet Sharma, Long Beach, CA (US); Sujata Banerjee, Sunnyvale, CA (US); Parthasarathy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1607 days.

(21) Appl. No.: 11/496,945

(22) Filed: Aug. 1, 2006

(51) Int. Cl.
   *H04L 12/56* (2006.01)
(52) U.S. Cl.
   USPC ............................ 370/389; 370/392; 370/351
(58) Field of Classification Search
   USPC .................................. 370/390, 389, 395, 353
   See application file for complete search history.

(56) References Cited

U.S. PATENT DOCUMENTS

| | | | | |
|---|---|---|---|---|
| 5,615,254 A * | 3/1997 | Qiu et al. | ................. | 379/221.01 |
| 6,430,687 B1 * | 8/2002 | Aguilar et al. | ..................... | 713/2 |
| 6,628,649 B1 * | 9/2003 | Raj et al. | ........................ | 370/360 |
| 6,819,654 B2 * | 11/2004 | Soloway et al. | .............. | 370/238 |
| 7,315,510 B1 * | 1/2008 | Owens et al. | .................. | 370/218 |
| 7,474,616 B2 * | 1/2009 | Connor | ....................... | 370/230.1 |
| 7,551,595 B2 * | 6/2009 | Dharia et al. | ................. | 370/347 |
| 7,564,791 B2 * | 7/2009 | Jayakrishnan et al. | ....... | 370/236 |
| 2002/0126674 A1 * | 9/2002 | Hemmady | ................. | 370/395.1 |
| 2003/0065497 A1 | 4/2003 | Rhoads | | |
| 2003/0145108 A1 * | 7/2003 | Joseph et al. | ................. | 709/239 |
| 2003/0154236 A1 | 8/2003 | Dar et al. | | |
| 2003/0229720 A1 | 12/2003 | Kiremidjian et al. | | |
| 2003/0231595 A1 * | 12/2003 | Zino et al. | ...................... | 370/238 |
| 2004/0018841 A1 * | 1/2004 | Trossen | ........................ | 455/436 |
| 2004/0090955 A1 * | 5/2004 | Berthaud et al. | .............. | 370/386 |
| 2006/0080370 A1 * | 4/2006 | Torii et al. | ...................... | 707/204 |
| 2007/0280239 A1 * | 12/2007 | Lund | .............................. | 370/392 |

OTHER PUBLICATIONS

Analysis of Power consumption on switch fabrics in network routers, Ye, 2002.*
"Building and Measuring High Performance Network Architecture" by Kramer, 2000.*
Gupta, M. et al., "Feasibility Study for Power Management in LAN Switches", Proc. of the 12th IEEE Conf. on Network Protocals (ICNP'04) 2004.
Gupta, M. et al., "Greening of the Internet", SIGCOMM'03, ACM Aug. 2003.
Kumar, R. et al., "Processor Power Reduction Via Single-ISA Heterogeneous Multi-Core Architectures", Apr. 2003.
Want, B. et al., "Computational Energy Cost of TCP", ACM Sigmetrics'03 Conf.

* cited by examiner

*Primary Examiner* — Man Phan
*Assistant Examiner* — Pamit Kaur

(57) ABSTRACT

A heterogeneous network switch system includes heterogeneous network switches having a first network switch having a first functionality and a second network switch having a second functionality, where the first functionality differs from the second functionality. In addition, the first network switch and the second network switch are configured to forward data to at least one common server. The system also includes a controller configured to receive data from at least one client and to select one of the first network switch and the second network switch to employ in forwarding the data from the at least one client to the at least one common network equipment.

20 Claims, 5 Drawing Sheets

HETEROGENEOUS NETWORK SWITCH SYSTEM

RELATED APPLICATIONS

This application incorporates by reference in their entireties the following commonly assigned U.S. Utility patent applications: Ser. No. 11/496,860, entitled "POWER-BASED NETWORKING RESOURCE ALLOCATION"; and Ser. No. 11/496,859, entitled "POWER-BASED NETWORKING PATH ALLOCATION", both of which were filed on Aug. 1, 2006.

BACKGROUND

Data centers are typically equipped with a networking backplane that provides connectivity between various computing devices. The networking backplane includes network switching equipment at various layers to enable a number of clients, such as application servers and end user workstations, to access a number of database servers. The network switching equipment typically includes network devices that forward traffic between the clients and the servers based on information available at the data link layer (Layer 2 of the OSI reference model), such as the MAC layer address in Ethernet, Token Ring, Fibre Channel or other types of packet switched network segments.

The networking backplane, including the network switching equipment, is normally over-provisioned to enable the networking backplane to support peak levels of traffic predicted to occur between the various computing devices. As such, the networking backplane employed in typical data centers often requires greater amounts of power than is usually required for the networking backplane to support the traffic between the servers. In other words, the amount of traffic between the servers is typically much less than the maximum levels that the data center networking backplanes are designed to support. The amount of energy used to power conventional networking backplanes, therefore, is often inefficiently utilized and results in unnecessary costs.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a heterogeneous network switch system and methods for implementing the heterogeneous network switch system. The heterogeneous network switch system includes a plurality of heterogeneous network switches configured to consume at least two different amounts of power with respect to each other. The heterogeneous network switches may be connected between the same client and network equipment such that they may selectively be employed in communicating data between the client and the network equipment. More particularly, for instance, a controller may be configured to select one of at least one first type of network switch and at least one second type of network switch to employ in communicating data between the client and the network equipment.

In one regard, the controller is configured to make the selection to substantially optimize the amount of energy consumed by the heterogeneous network switch system in relation to the amount of data being forwarded between the client and the network equipment. In addition, the amount of energy consumed may substantially be optimized without substantially compromising the robustness as well as the efficiency of the network switch system. In another regard, the controller is configured to activate at least one of the second type of network switch in response to a determination that the first type of network switch has failed. In other words, the controller is configured to employ the second type of network switch as a backup for the first type of network switch to thereby provide uninterrupted service, even in situations where the first type of network switch has failed.

Figure 1:
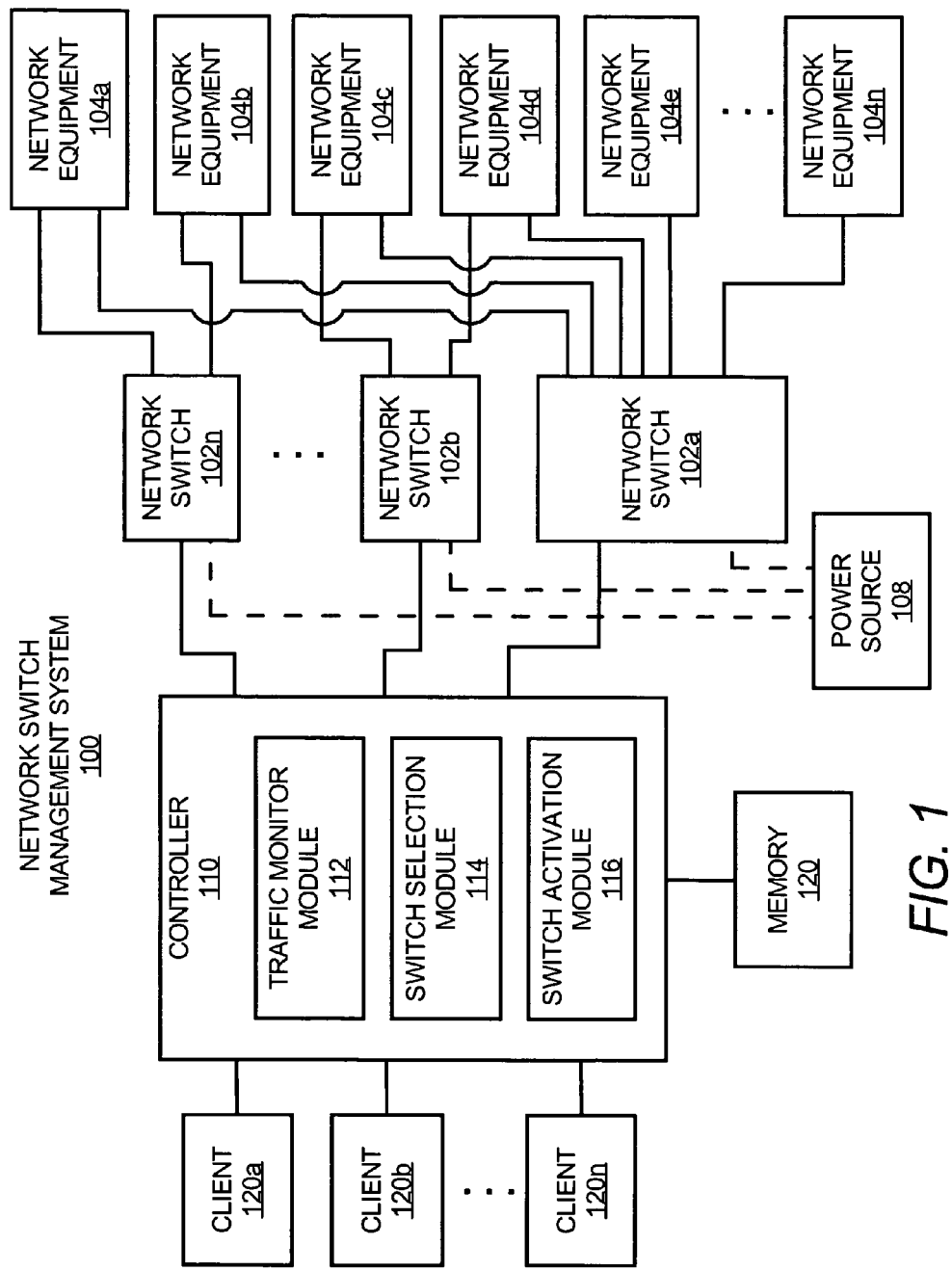
FIG. 1 shows a block diagram of a heterogeneous network switch system, according to an embodiment of the invention.

With reference first to FIG. 1, there is shown a block diagram of a heterogeneous network switch system 100 according to an example of the invention. It should be understood that the following description of the heterogeneous network switch system 100 is but one manner of a variety of different manners in which such a heterogeneous network switch system 100 may be configured and operated. In addition, it should be understood that the heterogeneous network switch system 100 may include additional components and that some of the components described may be removed and/or modified without departing from a scope of the heterogeneous network switch system 100.

The heterogeneous network switch system 100 may generally be employed to control forwarding of data between various computing devices through a plurality of heterogeneous network switches 102a-102n, where "n" represents an integer greater than 1. In one example, the heterogeneous network switch system 100 is operable to control the forwarding of data through any reasonably suitable number of network switches 102a-102n in various manners that substantially minimize the amount of energy consumed by the network switches 102a-102n. In addition or alternatively, the heterogeneous network switch system 100 is operable to employ one or more of the network switches 102a-102n as redundant switches that may be activated in the event that one or more of the other network switches 102a-102n fails.

In any regard, the network switches 102a-102n may comprise any reasonably suitable type of network switch configured to forward data to network equipment 104a-104n at any tier inside or outside of a networking environment, such as a data center. The terms "data center" are generally meant to denote a room or other space and are not meant to limit the invention to any specific type of room where data is communicated or processed, nor should it be construed that use of the terms "data center" limits the invention in any respect other than its definition hereinabove. The terms "data center" as referenced throughout the present disclosure may also denote any physically collocated collection of computing equipment, such as, for instance, computing equipment contained in a single rack, a cluster of racks, etc. In addition, although particular reference is made throughout to CRAC units, various other types of air conditioning units may be employed. For instance, if the "data center" as referenced herein comprises a rack of computing equipment, the CRAC units may comprise, for instance, server air conditioning units, fans and cooling systems specific to the rack, etc.

By way of example, the network switches 102a-102n may be configured to forward data to network equipment 104a-104n in a plurality of data centers. As other examples, the network switches 102a-102n may be configured to forward data to a plurality of racks in a data center, a plurality of servers, etc. The servers or other components may comprise, for instance, rack mounted servers, blade PCs, nodes in computer network, network switches, storage systems, etc. In addition, or alternatively, the network switches 102a-102n may be configured to forward data to other network switches, for instance, network switches configured under different tiers as the network switches 102a-102n. As such, the network equipment 104a-104d depicted in FIG. 1 may represent any number of different types of devices to which the network switches 102a-102n may forward data.

Some of the network switches 102a-102n are depicted in FIG. 1 as comprising heterogeneous configurations with respect to each other. Generally speaking, one or more of the network switches 102a-102n are heterogeneous with respect to each other because one or more of the network switches 102a-102n may have differing functionalities as compared with the other network switches 102a-102n. The differing functionalities may include, for instance, the number of ports on the network switches 102a-102n, the bandwidth capacities of the network switches 102a-102n, etc. In addition, the differing functionalities may result in differing capacity levels and power consumption levels of the network switches 102a-102n. Thus, for instance, those network switches 102a-102n having greater functionalities may consume greater amounts of power.

More particularly, for instance, the network switches labeled as "102b-102n" are illustrated as being relatively smaller, and thus, having relatively lesser functionalities, than the network switch labeled as "102a". In addition, the network switch 102a is shown as being configured to switch between all of the network equipment 104a-104n, whereas the network switches 102a and 102b are depicted as being configured to switch between respective pairs of the network equipment 102a-102n. As such, for instance, each of the network equipment 104a-104n may receive data from at least two of the network switches 102a-102n.

In one example, the network switch labeled as "102a", for instance, which may be considered as the first network switch, may be provisioned with sufficient functionality to handle peak levels of traffic predicted to occur in a network connecting at least one client 120a-120n and a number of network equipment 104a-104n. In this example, the network switches labeled as "102b-102n", which may be considered as the second network switches, may be provisioned with sufficient functionality to handle substantially less than the predicted peak levels of traffic. As such, for instance, one or more of the first and second network switches 102a-102n may have different functionalities, or are otherwise heterogeneous, with respect to each other.

In another example, both the first and second network switches 102a-102n may have functionalities that fall below the predicted peak levels of traffic or a preset level below the predicted peak levels. In this example, a combination of first and/or second network switches 102a-102n may be employed to forward traffic between the clients 120a-120n and the network equipment 104a-104n. The determination of which or both of the first and second network switches 102a-102n are to be used may be based upon one or both of the functionalities and the energy requirements of the first and second network switches 102a-102n.

As described in greater detail herein below, by utilizing heterogeneous network switches 102a-102n in the heterogeneous network switch system 100, the amount of energy consumed by the network switches 102a-102n may be relatively reduced as compared with systems employing conventional network switches 102a-102n. In addition, utilization of the heterogeneous network switches 102a-102n, as disclosed herein, may reduce the costs associated with manufacturing the components of the heterogeneous network switch system 100. The costs may be reduced because the one or more network switches 102a-102n having the relatively lesser functionalities may be relatively less expensive to manufacture and obtain. Moreover, because network switches 102a-102n having lower power ratings generally require less space as compared with network switches 102a-102n having higher power ratings, the amount of space required by a redundant network switch is reduced as compared with systems that employ conventional network switches.

It should be readily understood that the network switch 102a-102n and the network equipment 104a-104n configurations depicted in FIG. 1 represent examples of a number of possible configurations and that these configurations may be varied in any number of manners without departing from a scope of the heterogeneous network switch system 100 disclosed herein. For instance, each of the network switches 102a-102n may be configured to switch between a greater number of network equipment 104a-104n than are depicted in FIG. 1.

As another example, the network switches 102a and 102b may be configured to switch between the same number of network equipment 104a-104n as the network switch 102n. In this example, the network switches 102a and 102b may have different functionalities than the network switch 102n based upon, for instance, the greater bandwidth capacity of the network switch 102n.

Also depicted in FIG. 1 is a controller 110 configured to control which of the heterogeneous switches 102a-102n is employed in forwarding data from one or more of the clients 120a-120n to the network equipment 104a-104n. The controller 110 may comprise a microprocessor, a micro-controller, an application specific integrated circuit (ASIC), and or other suitable device capable of performing a network switch 102a-102n selection process as described in greater detail herein below. As such, for instance, the controller 110 may form part of a network switch configured to select the network switches 102a-102n for forwarding data.

In addition, or alternatively, the controller 110 may be configured to perform processing tasks, such as, a workload allocation function, other than the switching function. In other words, the controller 110 may function to select which of the network equipment 104a-104n is to receive the data to perform various workloads. In this capacity, the controller 110 may select one of the network switches 102a-102n to forward the data to the selected network equipment 104a-104n.

By way of example, the controller 110 may receive a workload request from a client 120a. The controller 110 may determine the requirements, such as, the number of servers, the processing capabilities of the servers, hard drive requirements, service level agreement requirements, etc., needed to perform the workload request. This determination may be made from information transmitted with the workload request or it may be determined by the controller 110. In any respect, the controller 110 may implement the network switches 102a-102n to forward the workload request to the appropriate network equipment 104a-104n.

The controller 110 is depicted as including a traffic monitor module 112, a switch selection module 114, and a switch activation module 116. Some or all of the modules 112-116 may comprise software stored either locally or in an external memory 120 which the controller 110 may implement. In addition, or alternatively, some or all of the modules 112-116 may comprise one or more hardware devices that may be implemented by the controller 110. As such, for example, the controller 110 may be stored at a single location or the controller 110 may be stored in a distributed manner across multiple locations, where the locations comprise at least one of hardware and software.

In one example, the controller 110 is configured to substantially minimize the amount of energy consumed in forwarding data between the clients 120a-120n and the network equipment 104a-104n. In other words, the controller 110 is configured to selectively implement the network switches 102a-102n and to reduce the power consumption state or to deactivate one or more of the network switches 102a-102n as traffic conditions through the network switches 102a-102n vary. In another example, the controller 110 may operate some or all of the network switches 102a-102n in a redundant manner to thereby provide fail-safes in the event that one or more of the network switches 102a-102n fail.

In the first example, the controller 110 may implement the traffic monitor module 112 to monitor the amount of traffic flowing between the clients 120a-120n and the network switches 102a-102n. Based upon the level of traffic, for instance, the controller 110 may implement the switch selection module 114 to select one or more of the network switches 102a-102n to employ in forwarding data between the clients 120a-120n. More particularly, for instance, the switch selection module 114 may be programmed to selectively implement the network switches 102a-102n to substantially minimize the amount of energy required to forward data to the appropriate locations in a network.

By way of example, the switch selection module 114 may select to implement the larger network switch 102a when the traffic levels are above a predetermined level. In this example, the switch selection module 114 may select to implement one or more of the smaller network switches 102b-102n when the traffic levels are below the predetermined level. The predetermined level may comprise, for instance, the maximum traffic level that the smaller network switches 102b-102n are capable of handling, a level based upon a curve that represents the relationship between the power consumed by the network switches 102a-102n and the functionalities of the network switches 102a-102n, etc.

Although only a single predetermined level has been described, it should be understood that any reasonably suitable number of predetermined levels may be used to enable any reasonably suitable number of network switch 102a-102n combinations to be employed in forwarding data while substantially reducing power consumption levels. In this regard, the controller 110 may implement the switch selection module 114 to selectively implement one or more of the network switches 102a-102n in various combinations to substantially match the detected traffic levels.

In addition, the controller 110 may implement the switch activation module 116 to selectively activate and deactivate the network switches 102a-102n. The term "activate" may be defined as placing the network switches 102a-102n into states in which the network switches 102a-102n are capable of performing their designed functions. The term "deactivate" may be defined as placing the network switches 102a-102n into an inactive state where the network switches 102a-102n consume little or no power. As such, for instance, a network switch 102a-102n may be considered as being deactivated when the network switch 102a-102n is either turned off or in a reduced power state, such as, a "standby" mode.

The controller 110 may implement the switch activation module 116 to deactivate one or more of the network switches 102a-102n that have not been selected for implementation by the switch selection module 114. As such, the unselected network switches 102a-102n may draw little or no power from a power source 108, which generally reduces the overall power consumption rate of all of the network switches 102a-102n.

In the second example, the controller 110 may implement the network switches 102a-102n to provide redundancy for each other in the event that one or more of the network switches 102a-102n fails. In this example, the controller 110 may again implement the traffic monitor module 112 to monitor the amount of traffic flowing between the clients 120a-120n and the network switches 102a-102n. In addition, the controller 110 may implement the switch selection module 114 to operate in a default manner, which may include implementing the first network switch, such as the larger network switch 102a, to forward the data.

If the traffic monitor module 112 determines that the data flow through the network switch 102n has slowed or is below a predetermined level, the controller 110 may determine that the first network switch 102n has failed. The controller 110 may also make this determination by tracking the health of the network switch 102n. More particularly, for instance, some or all of the network switches 102a-102n may be configured to communicate their status information to the controller 110, which the controller 110 may use in monitoring whether the one or more network switches 102a-102n are operating properly.

If the controller 110 determines that one or more of the network switches 102a-102n have failed, the controller 110 may implement the switch selection module 114 to select one or more other redundant network switches 102a-102n to forward the data between the clients 120a-120n and the network equipment 104a-104n. The selection and implementation of the one or more redundant network switches 102a-102n may be performed in a substantially automatic and instantaneous manner by the controller 110. In addition, the controller 110 may implement the switch selection module 114 to reactivate the first network switch 102a upon determining that the first network switch 102a has recovered.

Figure 2:
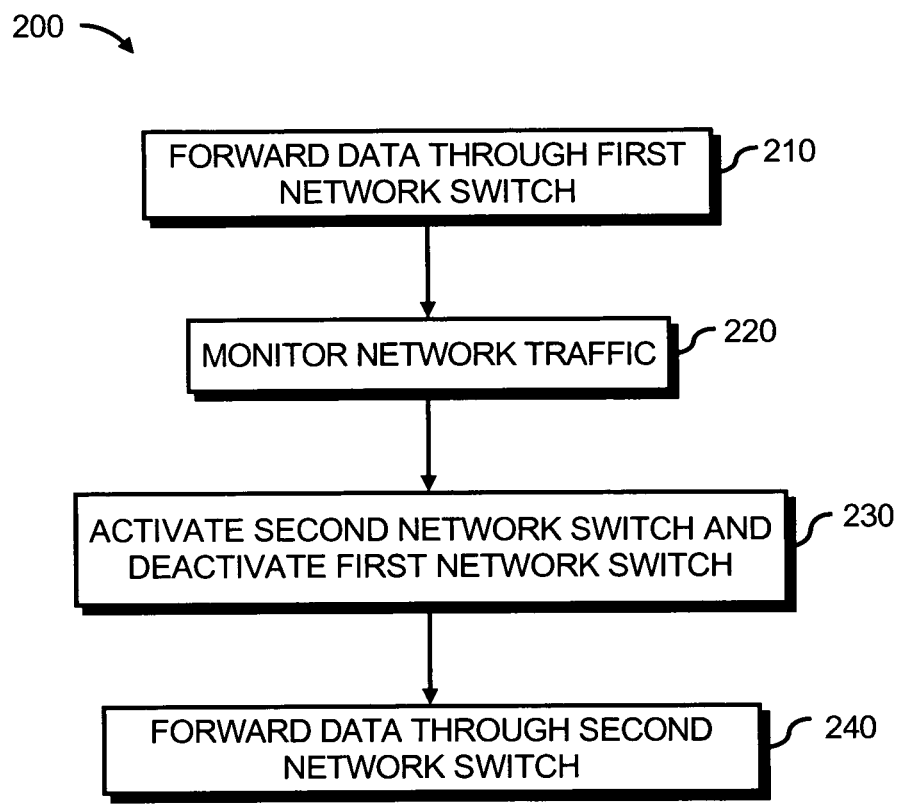
FIG. 2 shows a flow diagram of a method for communicating data in a heterogeneous network switch system, according an embodiment of the invention.

Turning now to FIG. 2, there is shown a flow diagram of a method 200 for communicating data in a heterogeneous network switch system 100, according to an example. It is to be understood that the following description of the method 200 is but one manner of a variety of different manners in which an example of the invention may be practiced. It should also be apparent to those of ordinary skill in the art that the method 200 represents a generalized illustration and that other steps may be added or existing steps may be removed, modified or rearranged without departing from a scope of the method 200.

The following description of the method 200 is made with reference to the heterogeneous network switch system 100 illustrated in FIG. 1, and thus makes reference to the elements cited therein. It should, however, be understood that the method 200 is not limited to the elements set forth in the heterogeneous network switch system 100. Instead, it should be understood that the method 200 may be practiced by a system having a different configuration than that set forth in the heterogeneous network switch system 100.

At step 210, data from at least one of the clients 120a may be forwarded through a first network switch 102a to at least one network equipment 104a. In addition, at step 220, the controller 110 may implement the traffic monitor module 112 to monitor the traffic between the at least one client 120a and the at least one network equipment 104a. In addition or alternatively to the traffic monitor module 112 actively monitoring traffic at step 220, the traffic monitor module 112 may monitor the traffic through receipt of a profile of the workload to be performed from, for instance, a workload allocator of the data center in which the network switches 102a-102n are employed, such as the controller 110. In this instance, for example, the requestor of the workload to be performed may submit profiles of the workload to the controller 110, which may use the workload profiles in implementing the traffic monitor module 112 to predict the anticipated traffic levels between the at least one client 120a and the at least one network equipment 104a.

Based upon the monitored network traffic level, the controller 110 may implement the switch selection module 114 to activate a second network switch 102b, which has a different functionality from the first network switch 102a, as indicated at step 230. In addition, at step 240, data between the at least one client 120a and the at least one network equipment 104a may be forwarded through the second network switch 102b.

Figure 3A:
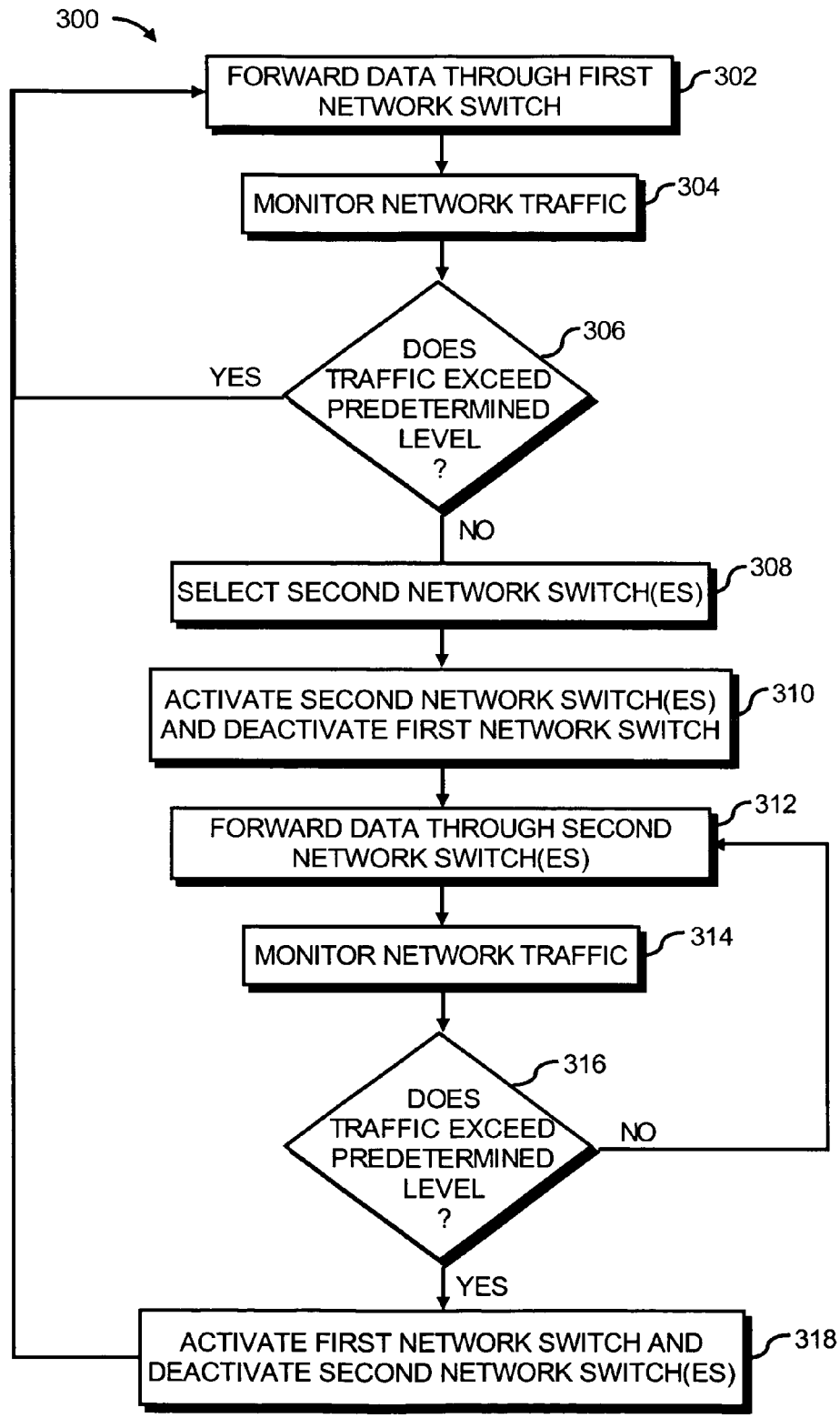
FIG. 3A shows a flow diagram of a method for varying the forwarding of data in a heterogeneous network switch system, according to an embodiment of the invention.
Figure 3B:
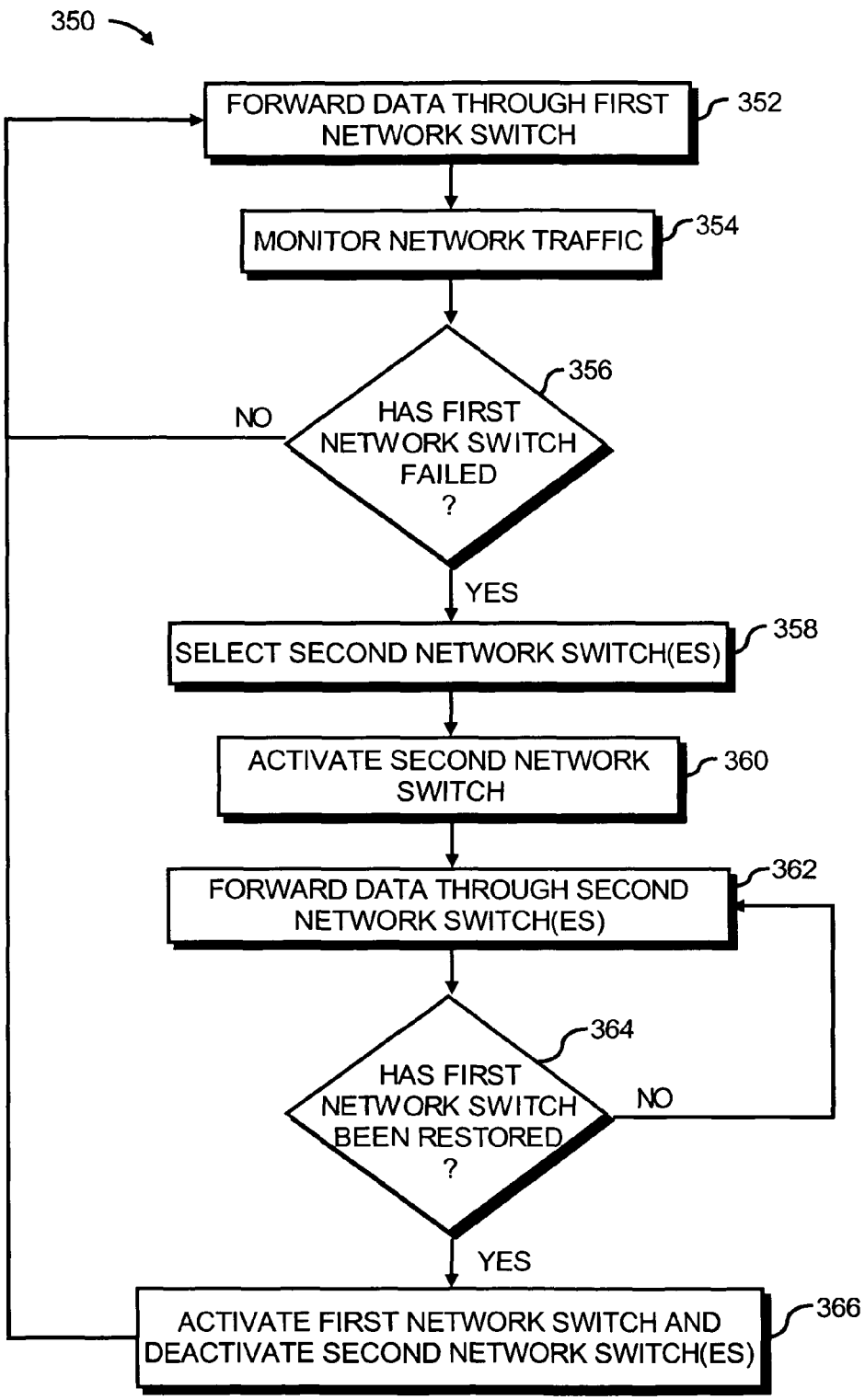
FIG. 3B shows a flow diagram of a method for varying the forwarding of data in a heterogeneous network switch system, according to another embodiment of the invention.

The steps outlined in FIG. 2 are described in greater detail with respect to FIGS. 3A and 3B. Although the methods 300 and 350 depicted in FIGS. 3A and 3B, respectively, are described as separate methods, it should be understood that the methods 300 and 350 may be implemented substantially concurrently without departing from a scope of the invention.

With reference first to FIG. 3A, there is shown a flow diagram of a method 300 for varying the forwarding of data in a heterogeneous network switch system 100, according to an example. It is to be understood that the following description of the method 300 is but one manner of a variety of different manners in which an example of the invention may be practiced. It should also be apparent to those of ordinary skill in the art that the method 300 represents a generalized illustration and that other steps may be added or existing steps may be removed, modified or rearranged without departing from a scope of the method 300.

Generally speaking, the method 300 may be performed to substantially minimize costs associated with forwarding data between clients 120a-120n and network equipment 104a-104n. The costs may substantially be minimized because the heterogeneous network switches 102a-102n may selectively be activated and deactivated, such that, one or more network switches 102a-102n having predetermined levels of functionality are employed to perform the switching functions instead of continuously using network switches having functionalities rated for predicted peak levels of traffic. Because the higher rated network switches generally consume greater amounts of power, the costs may substantially be reduced through use of network switches having lesser functionalities as described herein.

The description of the method 300 is made with reference to the heterogeneous network switch system 100 illustrated in FIG. 1, and thus makes reference to the elements cited therein. It should, however, be understood that the method 300 is not limited to the elements set forth in the heterogeneous network switch system 100. Instead, it should be understood that the method 300 may be practiced by a system having a different configuration than that set forth in the heterogeneous network switch system 100.

At step 302, data from at least one of the clients 120a may be forwarded through a first network switch 102a to at least one network equipment 104a. The first network switch 102a may comprise a default network switch. Thus, for instance, the first network switch 102a may comprise a network switch having sufficient functionality to handle peak levels of traffic predicted to occur in a network connecting the at least one client 120a and the at least one network equipment 104a.

At step 304, the controller 110 may implement the traffic monitor module 112 to monitor the traffic between the at least one client 120a and the at least one network equipment 104a, in manners as described herein above with respect to step 210 (FIG. 2). In addition, at step 306, the controller 110 may determine whether the monitored traffic exceeds a predetermined level. The predetermined level may comprise, for instance, the maximum traffic level that smaller network switches 102b-102n are capable of handling, a level based upon a curve that represents the relationship between the power consumed by the network switches 102a-102n and the functionalities of the network switches 102a-102n, etc.

If the controller 110 determines that the traffic does exceed the predetermined level at step 306, the controller 110 may continue forwarding data through the first network switch 102a, as indicated at step 302. Steps 302-306 may, therefore, be substantially continuously performed to thereby cause traffic to flow through the first network switch 102a so long as the traffic exceeds the predetermined level.

If, however, the traffic falls below the predetermined level, the controller 110 may implement the switch selection module 114 to select one or more second switches 102a-102n, as indicated at step 308. As discussed above, the one or more second switches 102a-102n are considered to be heterogeneous with respect to the first switch because the one or more second network switches 102b-102n are provisioned with sufficient functionality to handle substantially less than the peak levels of traffic. Step 308 may be optional because the one or more second network switches 102b-102n may have previously been selected by the controller 110.

In any regard, at step 310, the controller 110 may implement the switch activation module 116 to activate the selected one or more second network switches 102b-102n and to deactivate the first network switch 102a. The activation of the selected one or more second network switches 102b-102n and the deactivation of the first network switch 102a may be performed in various manners to substantially prevent an appreciable amount of traffic loss during the transition. In this respect, for instance, the switch activation module 116 may delay deactivation of the first network switch 102a until substantially all of the traffic has been switched over to the selected one or more second network switches 102b-102n.

In addition, at step 312, the data may be forwarded through the one or more second network switches 102b-102n. As such, for instance, the amount of power required to operate the network switches 102a-102n while enabling the monitored level of traffic to be handled may substantially be minimized.

The traffic flow between the at least one client 120a and the at least one network equipment 104a through the one or more second switches 102b-102n may be monitored by the traffic monitor module 112, as indicated at step 314. Again, step 314 may be similar to step 210 (FIG. 2). In addition, at step 316, the controller 110 may again determine whether the monitored traffic exceeds the predetermined level.

If the controller 110 determines that the traffic does not exceed the predetermined level at step 316, the controller 110 may continue forwarding data through the one or more second network switches 102b-102n, as indicated at step 312. Steps 312-316 may, therefore, be substantially continuously performed to thereby cause traffic to flow through the one or more second network switches 102b-102n so long as the traffic does not exceed the predetermined level.

If, however, the traffic exceeds the predetermined level, the controller 110 may implement the switch activation module 116 to activate the first network switch 102a and to deactivate the one or more second network switches 102b-102n, as indicated at step 318. The activation of the first network switch 102a and the deactivation of the one or more second network switches 102b-102n may be performed in various manners to substantially prevent an appreciable amount of traffic loss during the transition. In this respect, for instance, the switch activation module 116 may delay deactivation of the one or more second network switches 102b-102n until substantially all of the traffic has been switched over to the first network switch 102a.

In addition, step 302 may be repeated, such that data may be forwarded through the first network switch 102a. Steps 304-318 may be repeated in a substantially continuous manner or for a predetermined period of time to thereby substantially optimize the power consumption levels of the network switches 102a-102n with respect to the traffic levels handled by the network switches 102a-102n.

Although particular reference has been made to the first network switch 102a as comprising the default network switch, the method 300 may also be performed in situations where one or more of the second network switches 102b-102n comprise default network switches. In this instance, step 312 may be performed as the first step in FIG. 3A, with all of the other steps following step 312.

Turning now to FIG. 3B, there is shown a flow diagram of a method 350 for varying the forwarding of data in a heterogeneous network switch system 100, according to another example. It is to be understood that the following description of the method 350 is but one manner of a variety of different manners in which an example of the invention may be practiced. It should also be apparent to those of ordinary skill in the art that the method 350 represents a generalized illustration and that other steps may be added or existing steps may be removed, modified or rearranged without departing from a scope of the method 350.

Generally speaking, the method 350 may enable one or more of the second network switches 102b-102n to be employed as redundant or backup switches. In this regard, if the first network switch 102a is determined to have failed, one or more of the second network switches 102b-102n may be activated to thereby substantially prevent a disruption in the communication of data between the clients 120a-120n and the network equipment 104a-104n. In addition, through use of the heterogeneous network switches 102a-102n, the costs associated with providing the redundant network switches is substantially reduced as compared with conventional heterogeneous redundant network switch configurations due to the lower costs for the lesser functionality second network switches 102b-102n.

The description of the method 350 is also made with reference to the heterogeneous network switch system 100 illustrated in FIG. 1, and thus makes reference to the elements cited therein. It should, however, be understood that the method 350 is not limited to the elements set forth in the heterogeneous network switch system 100. Instead, it should be understood that the method 350 may be practiced by a system having a different configuration than that set forth in the heterogeneous network switch system 100.

At step 352, data from at least one of the clients 120a may be forwarded through a first network switch 102a to at least one network equipment 104a. The first network switch 102a may comprise a default network switch and may comprise a network switch having sufficient functionality to handle peak levels of traffic predicted to occur in a network connecting the at least one client 120a and the at least one network equipment 104a.

At step 354, the controller 110 may implement the traffic monitor module 112 to monitor the traffic between the at least one client 120a and the at least one network equipment 104a. In addition, at step 356, the controller 110 may determine whether the first network switch 102a has failed. In one example, the controller 110 may determine that the first network switch 102a has failed if the traffic flow through the first network switch 102a has ceased or has fallen below some predefined level. In another example, the controller 110 may determine that the first network switch has failed based upon communications or signals received from the first network switch 102a.

In any regard, if the controller 110 determines that the first network switch 102a has not failed at step 356, the controller 110 may continue forwarding data through the first network switch 102a. In addition, the controller 110 may repeat steps 352-356 until the controller 110 determines that the first network switch 102a has failed at step 356. In this instance, the controller may implement the switch selection module 114 to select one or more second switches 102a-102n, as indicated at step 358. As discussed above, the one or more second switches 102a-102n are considered to be heterogeneous with respect to the first switch because the one or more second network switches 102b-102n are provisioned with sufficient functionality to handle substantially less than the peak levels of traffic. Step 358 may be optional because the one or more second network switches 102b-102n may have previously been selected by the controller 110.

In any regard, at step 360, the controller 110 may implement the switch activation module 116 to activate the selected one or more second network switches 102b-102n. In addition, at step 362, the data may be forwarded through the one or more activated second network switches 102b-102n. Steps 358-362 may be performed in a relatively quick and automatic manner to thereby substantially prevent disruptions in the flow of data between the clients 120a-120n and the network equipment 104a-104n. As such, for instance, the flow of data between the clients 120a-120n and the network equipment 104a-104n may continue without substantial interruption. And, in certain instances, such as when the first network switch 102a has not completely failed, the controller 110 may be able to switch the traffic over to the selected one or more second network switches 102b-102n without a substantial loss in the network traffic. As such, in these instances, the switch may occur without any substantial disruption in service.

The controller 110 may monitor whether the first network switch 102a has been restored as indicated at step 364. By way of example, the controller 110 may receive signals from the first network switch 102a when the first network switch 102a has been restored. As another example, a user may provide an indication to the controller 110 that the first network switch 102a has been restored.

In any regard, if the controller 110 determines that the first network switch 102a has not been restored at step 364, the controller 110 may continue forwarding data through the one or more second network switches 102b-102n, as indicated at step 362. Steps 362 and 364 may, therefore, be substantially continuously performed to thereby cause traffic to flow through the one or more second network switches 102b-102n so long as the first network switch 102a has not been restored.

If, however, the controller 110 determines that the first network switch 102a has been restored at step 364, the controller 110 may implement the switch activation module 116 to activate the first network switch 102a and to deactivate the one or more second network switches 102b-102n, as indicated at step 366. In addition, step 352 may be repeated, such that data may again be forwarded through the first network switch 102a. Steps 354-366 may be repeated in a substantially continuous manner or for a predetermined period of time to thereby enable data to flow between the clients 120a-120n and the network equipment 104a-104n in a substantially uninterrupted manner.

Although particular reference has been made to the first network switch 102a as comprising the default network switch, the method 350 may also be performed in situations where one or more of the second network switches 102b-102n comprise default network switches. In this instance, the "first network switch" and the "second network switch(es)" may be replaced with each other in the method 350. As such, for instance, the first network switch 102a may be activated when the one or more second network switches 102b-102n are determined to have failed.

The operations set forth in the methods 200, 300, and 350 may be contained as a utility, program, or subprogram, in any desired computer accessible medium. In addition, the methods 200, 300, and 350 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
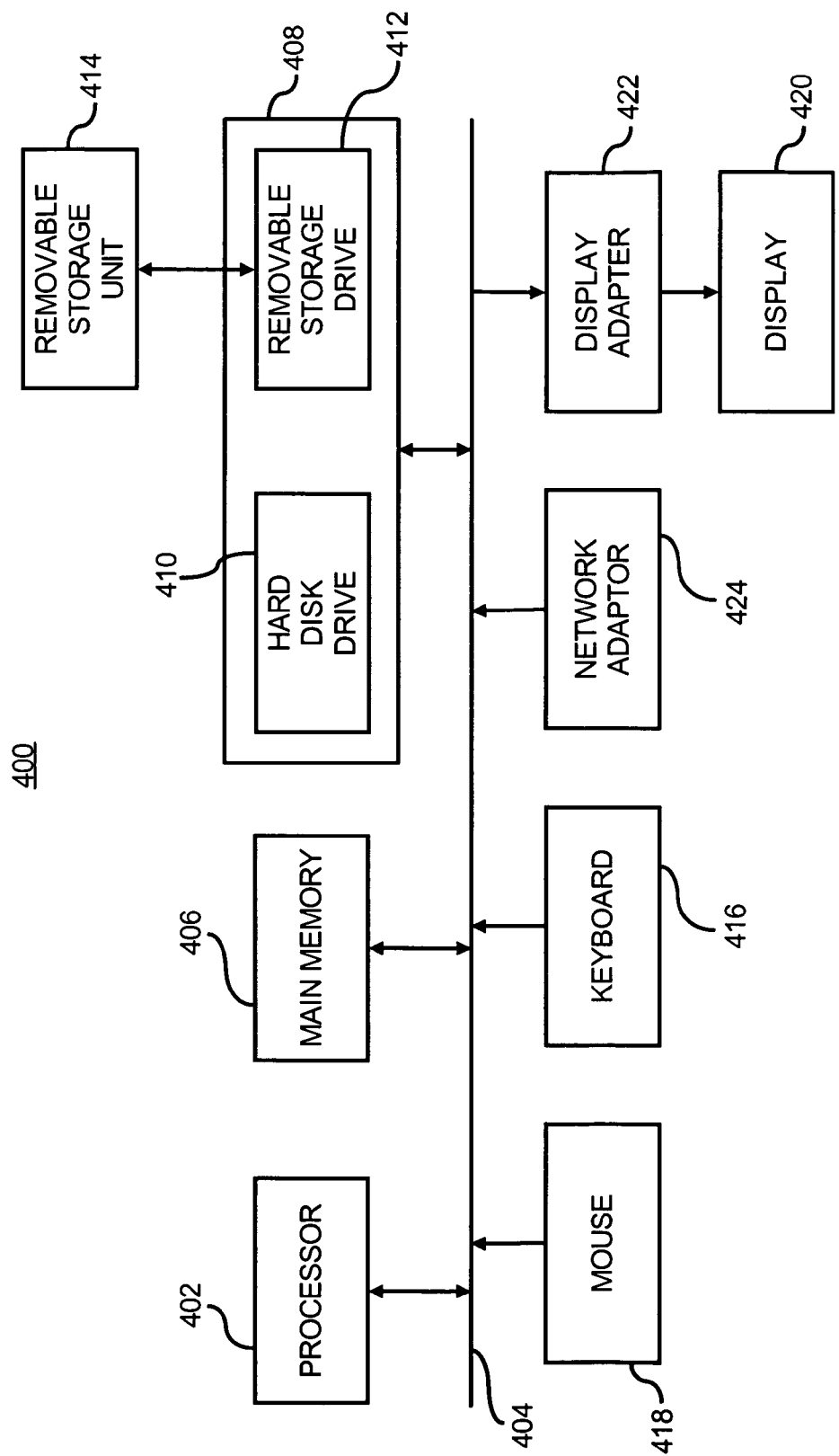
FIG. 4 illustrates a computer system, which may be employed to perform various functions described herein, according to an embodiment of the invention.

FIG. 4 illustrates a computer system 400, which may be employed to perform the various functions of the controller 110 described herein above, according to an example. In this respect, the computer system 400 may be used as a platform for executing one or more of the functions described hereinabove with respect to the controller 110.

The computer system 400 includes one or more controllers, such as a processor 402. The processor 402 may be used to execute some or all of the steps described in the methods 200, 300, and 350. Commands and data from the processor 402 are communicated over a communication bus 404. The computer system 400 also includes a main memory 406, such as a random access memory (RAM), where the program code for, for instance, the controller 110, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the management of heterogeneous network switches may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor 402 may communicate over a network, for instance, the Internet, LAN, etc., through a network adaptor 424.

It will be apparent to one of ordinary skill in the art that other known electronic components may be added or substituted in the computer system 400. In addition, the computer system 400 may include a system board or blade used in a rack in a data center, a conventional "white box" server or computing device, etc. Also, one or more of the components in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A heterogeneous network switch system, said system comprising:

a plurality of heterogeneous network switches, wherein the heterogeneous network switches comprise a first network switch having a first functionality and a second network switch having a second functionality, wherein the first functionality differs from the second functionality, and wherein the first network switch and the second network switch are configured to forward data to at least one common network equipment; and a controller configured to receive data from at least one client, to monitor a level of traffic flowing across the first network switch, and to select the second network switch to employ in forwarding the data from the at least one client to the at least one common network equipment when the monitored level of traffic and the predicted level of traffic are within the second functionality of the second network switch, wherein the second network switch is selected based on: a predicted level of traffic, the functionality of the second network switch, and energy requirements of the second network switch, and wherein the first network switch is provisioned with sufficient functionality to handle peak levels of traffic predicted to occur in a network connecting the at least one client and the at least one common network equipment and wherein the second network switch is provisioned with sufficient functionality to handle substantially less than the peak levels of traffic.

2. The system according to claim 1, wherein the controller is further configured to deactivate the first network switch when the traffic is below a predetermined level.

3. The system according to claim 2, wherein the controller is further configured to deactivate the second network switch when the traffic is above the predetermined level.

4. The system according to claim 2, wherein the plurality of heterogeneous network switches comprises a plurality of second network switches, and wherein the controller is further configured to select a plurality of the second network switches to employ in forwarding the data from the client to the at least one common network equipment.

5. The system according to claim 1, wherein the controller is further configured to monitor traffic across the network through receipt and analysis of one or more profiles of workload destined to cause the traffic.

6. The system according to claim 1, wherein the second network switch is configured in the network as a redundant network switch to the first network switch.

7. The system according to claim 1, wherein the plurality of heterogeneous switches comprises a plurality of second switches, and wherein the controller is further configured to determine whether the first network switch has failed and to activate one or more of the plurality of second network switches in response to a determination that the first network switch has failed.

8. The system according to claim 1, wherein the first network switch and the second network switch are provisioned to handle substantially less than peak levels of traffic predicted to occur in a network connecting the at least one client and the at least one common network equipment, wherein the controller is configured to employ both the first network switch and the second network switch in directing traffic to a plurality of equipment.

9. The system according to claim 8, wherein the controller is further configured to deactivate one of the first network switch and the second network switch when the traffic is below a predetermined level.

10. The system according to claim 1, wherein the first network switch has a greater number of ports than the second network switch.

11. The system according to claim 1, wherein the first network switch has a higher bandwidth capacity than the second network switch.

12. A method for operating a controller, said controller being configured to control a plurality of heterogeneous network switches, said method performed in the controller and comprising:
receiving data from at least one client;
forwarding the data through a first network switch from the at least one client to at least one network equipment;
monitoring network traffic between the at least one client and the at least one network equipment through the first network switch;
determining a predicted level of traffic between the at least one client and the at least one network equipment through the first network switch based on a workload profile;
activating a second network switch having a different functionality from the first network switch in response to the monitored network traffic level; and
forwarding the data through the second network switch,
wherein the second network switch is activated based on: a predicted level of traffic, the functionality of the second network switch, and energy requirements of the second network switch, and
wherein the first network switch is provisioned with sufficient functionality to handle peak levels of traffic predicted to occur in a network connecting the at least one client and the at least one common network equipment and wherein the second network switch is provisioned with sufficient functionality to handle substantially less than the peak levels of traffic.

13. The method according to claim 12, further comprising:
receiving one or more workload profiles; and
wherein monitoring the network traffic further comprises predicting the network traffic based upon an analysis of the received one or more workload profiles.

14. The method according to claim 12, wherein monitoring the network traffic further comprises monitoring the network traffic to determine whether the network traffic is below a predetermined level and wherein activating the second network switch further comprises activating the second network switch in response to the network traffic falling below the predetermined level.

15. The method according to claim 14, further comprising:
deactivating the first network switch such that the first network switch consumes substantially less amount of power as compared to when the first network switch is active.

16. The method according to claim 15, further comprising:
delaying deactivation of the first network switch until substantially all of the network traffic through the first network switch has been switched over to the second network switch.

17. The method according to claim 15, further comprising:
determining whether the network traffic exceeds the predetermined level;
activating the first network switch in response to the network traffic exceeding the predetermined level; and
forwarding data through the first network switch.

18. The method according to claim 12, wherein monitoring the network traffic further comprises monitoring the network traffic to determine whether one of the first network switch and the second network switch has failed, and wherein activating the second network switch further comprises activating at least one of a plurality of second network switches in response to a determination that the first network switch has failed.

19. The method according to claim 12, wherein an amount of power consumed by the activated second network switch is different from an amount of power consumed by the activated first network switch.

20. A non-transitory computer readable storage medium on which is embedded one or more computer programs, said one or more computer programs implementing a method for operating a controller for controlling a plurality of heterogeneous network switches, said one or more computer programs comprising a set of instructions for:
receiving data from at least one client;
forwarding the data through a first network switch from the at least one client to at least one network equipment;
monitoring network traffic between the at least one client and the at least one network equipment through the first network switch;
determining a predicted level of traffic between the at least one client and the at least one network equipment through the first network switch based on a workload profile;
activating at least one second network switch in response to the monitored network traffic level and the predicted level of traffic falling below a predetermined level that is within a functionality of the at least one second network switch, wherein the first network switch has a different functionality than the at least one second network switch, wherein the first network switch is provisioned with sufficient functionality to handle peak levels of traffic predicted to occur in a network connecting the at least one client and the at least one common network equipment, and wherein the second network switch is provisioned with sufficient functionality to handle substantially less than the peak levels of traffic; and forwarding the data through the second network switch, wherein the second network switch is activated based on: the functionality of the second network switch, and energy requirements of the second network switch.

* * * * *

UNITED STATES PATENT AND TRADEMARK OFFICE
CERTIFICATE OF CORRECTION

PATENT NO. : 8,457,121 B1
APPLICATION NO. : 11/496945
DATED : June 4, 2013
INVENTOR(S) : Puneet Sharma et al.

Page 1 of 1

It is certified that error appears in the above-identified patent and that said Letters Patent is hereby corrected as shown below:

In the Claims

In column 13, line 22, in Claim 7, after "second" insert -- network --.

Signed and Sealed this
Fifth Day of November, 2013

Teresa Stanek Rea
*Deputy Director of the United States Patent and Trademark Office*